(12) United States Patent
Li et al.

(10) Patent No.: US 6,299,851 B1
(45) Date of Patent: Oct. 9, 2001

(54) METHOD FOR OXIDIZING HYDROGEN SULFIDE TO ELEMENTAL SULFUR

(75) Inventors: Kuo-Tseng Li, Taichung; Ren-Hai Chi, Taichung Hsien, both of (TW)

(73) Assignee: National Science Council, Taipei (TW)

( * ) Notice: Subject to any disclaimer, the term of this patent is extended or adjusted under 35 U.S.C. 154(b) by 0 days.

(21) Appl. No.: 09/334,851

(22) Filed: Jun. 17, 1999

Related U.S. Application Data

(63) Continuation-in-part of application No. 09/277,301, filed on Mar. 26, 1999.

(51) Int. Cl.[7] .................................................. C01B 17/04
(52) U.S. Cl. ..................................... 423/573.1; 423/576.8; 502/517
(58) Field of Search .............................. 423/573.1, 576.8; 502/517

(56) References Cited

U.S. PATENT DOCUMENTS

| | | | |
|---|---|---|---|
| 4,314,983 | * | 2/1982 | Hass et al. ............................ 423/542 |
| 5,653,953 | | 8/1997 | Li et al. ............................. 423/576.8 |
| 5,693,588 | * | 12/1997 | Poston ................................. 502/400 |
| 5,700,440 | * | 12/1997 | Li et al. ............................... 423/231 |
| 5,891,415 | * | 4/1999 | Alkhazov et al. ................. 423/573.1 |

OTHER PUBLICATIONS

P.F.M.T. van Nisselrooy and J.A. Lagas, "*Catalysis Today*", 16, p 263–271, 1993. "Superclaus reduces $SO_2$ emission by the use of a new selective oxidation catalyst".

R. Kettner and N. Liermann, *Oil and Gas Journal,* 86, p. 63–65, Jan. 11, 1988 "New Claus tail–gas process proved in German operation".

* cited by examiner

*Primary Examiner*—Steven P. Griffin
*Assistant Examiner*—Timothy C Vanoy
(74) *Attorney, Agent, or Firm*—Fay, Sharpe, Fagan, Fagan, Minnich & McKee, LLP

(57) ABSTRACT

A method for selectively oxidizing hydrogen sulfide to elemental sulfur is disclosed. The method is performed at a temperature ranged from 50 to 400° C. and at a pressure ranged from 0.1 to 50 atm. The elemental sulfur can be effectively recovered from a gas mixture containing hydrogen sulfide in the presence of a catalyst. The catalyst includes a vanadium-containing material and a catalytic substance selected from the group consisting of scandium (Sc), yttrium (Y), lanthanum (La), samarium (Sm) and compounds thereof. In another embodiment, this catalyst further includes an antimony-containing promoter (antimony compounds) which further exhibit a more effective catalytic performance.

14 Claims, No Drawings

METHOD FOR OXIDIZING HYDROGEN SULFIDE TO ELEMENTAL SULFUR

The present invention is a continuation-in-part application of the parent application bearing Ser. No. 09/277,301 and filed on Mar. 26, 1999.

FIELD OF THE INVENTION

The present invention is related to a method for oxidizing hydrogen sulfide to elemental sulfur, and more particularly to a method for recovering elemental sulfur from a gas mixture containing hydrogen sulfide.

BACKGROUND OF THE INVENTION

In the petroleum refinery process for producing various fuel oil such as gasoline, diesel, kerosene, etc., the sulfur in the crude oil is removed as hydrogen sulfide gas by hydrodesulfurization process. The highly toxic hydrogen sulfide gas is then converted to elemental sulfur in sulfur-recovery plants or so-called Claus plants. During the last two decades, a great number of Claus tail-gas treating (TGT) processes have been developed to increase the total sulfur-recovery efficiency. Conventional Claus TGT processes involve a hydrogen sulfide absorption step, in which a tail gas containing unreacted hydrogen sulfide is introduced into an alkaline bath. Removing the last percentages of sulfur by means of these conventional Claus TGT processes is relatively expensive, both in terms of capital investment cost and energy consumption.

Recently, in order to avoid the shortcomings of these solution-absorption type Claus TGT processes, two dry types of TGT processes have been developed, that is, Mobil-direct-oxidation process developed by Mobil AG Company in Germany (Oil and Gas Journal, 86, p.63–67, 1988) and Super-Claus Process developed by Comprimo Company in Netherlands (Catalysis Today, 16, p263–271, 1993), both of which comprise a step of recovering elemental sulfur from Claus tail gas by selective oxidation of hydrogen sulfide in the presence of a catalyst. The catalyst used in Mobil-direct-oxidation process contains titanium dioxide ($TiO_2$). The catalyst used in Super-Claus Process is an active mixture of iron and chromium oxides deposited on an alpha-alumina support. These dry type Claus TGT processes are simple and economical; however, the chromium atom contained in the catalyst is a toxic substance.

In our experimental studies, it was found that vanadium and magnesium mixed catalyst can effectively oxidize hydrogen sulfide to elemental sulfur (U.S. Pat No. 5,653,953 and Taiwanese Patent Published No. 92615). However, as the content of magnesium in the mixed catalyst is increased, the yield of sulfur will be significantly reduced.

Therefore, a major object of the present application is to improve the defects encountered with the prior arts.

SUMMARY OF THE INVENTION

An object of the present invention is to provide a method for oxidizing hydrogen sulfide to elemental sulfur.

Another object of the present invention is to provide a method for recovering elemental sulfur from a gas mixture containing hydrogen sulfide.

Another further object of the present invention is to provide a catalyst adapted to be used to oxidize hydrogen sulfide to elemental sulfur.

According to the present invention, the method includes a step of oxidizing hydrogen sulfide to elemental sulfur in the presence of a catalyst including a rare-earth-containing substance and a vanadium-containing material.

Preferably, the rare-earth containing substance is one selected from a group consisting of scandium (Sc), yttrium (Y), lanthanoid, actinoid, and a compound thereof.

Certainly, lanthanoid includes lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), and lutetium (Lu).

Certainly, actinoid includes actinium (Ac), thorium (Th), protactinium (Pa), uranium (U), neptunium (Np), plutonium (Pu), americium (Am), curium (Cm), berkelium (Bk), californium (Cf), einsteinium (Es), fermium (Fm), mendelevium (Md), nobelium (No), and lawrencium (Lr).

Preferably, the vanadium-containing material is one selected from a group consisting of metallic vanadium, vanadium oxide, vanadium sulfide, vanadium halogenide, vanadium nitride, vanadium phosphide, vanadium carbide, vanadium carbonyl, vanadium hydride, vanadium hydroxide, vanadium sulfate, vanadium nitrate, vanadium carbonate, vanadium acetate, vanadium oxalate, vanadium formate, vanadium phosphate, vanadium citrate, vanadium oleate, ammonium vanadium oxalate, ammonium vanadium citrate, vanadium hypohalogenate, vanadyl carbonate, vanadyl salicylate, vanadium chromate, ammonium vanadate, and vanadate.

The catalyst can be deposited on a carrier selected from a group consisting of monolith, particle, pellet, and porous carrier, wherein the porous carrier is one selected from a group consisting of alumina, silica, aluminum-and-silicon-containing compound, zeolite, titanium oxide, and zirconium oxide.

The molar ratio of rare-earth element of the rare-earth-containing substance to vanadium atom of the vanadium-containing material is ranged from 0.01:1 to 100:1, preferably from 0.1:1 to 10:1.

In another preferred embodiment of the present invention, the catalyst further includes a promoter for increasing the yield of the elemental sulfur. The molar ratio of the promoter to vanadium and rare earth element of the catalyst is ranged from 0.01:1 to 100:1, preferably from 0.1:1 to 10:1.

The promoter can be metallic antimony, antimony oxide, antimony sulfide, antimony halogenide, antimony carbide, antimony hydroxide, antimony hydride, antimony oxychloride, antimony sulfate, or antimonate.

The oxidizing reaction is performed at a temperature ranged between 50° C. and 400° C., preferably between 100° C. and 350° C.

In addition, the oxidizing reaction is performed at a pressure ranged from 0.1 to 50 atm, preferably 1 to 10 atm.

The present invention will be further illustrated by the following examples.

DETAILED DESCRIPTION OF THE PREFERRED EMBODIMENT

The present invention will now be described more detailedly with reference to the following embodiments. It is to be noted that the following descriptions of the preferred embodiments of this invention are presented herein for the purpose of illustration and description only. It is not intended to be exhaustive or to be limited to the precise form disclosed.

The present invention provides a method for oxidizing hydrogen sulfide to elemental sulfur, especially for recovering elemental sulfur from a gas mixture containing hydrogen sulfide. This oxidation is performed in the presence of a catalyst including a rare-earth-containing substance and a vanadium-containing material. The oxidation is performed at a temperature ranged from 50° C. to 400 ° C., preferably between 100° C. and 350° C., and under a pressure ranged from 0.1 to 50 atm, preferably 1 to 10 atm.

In our previous studies, we surprisedly found that the yield of sulfur can be greatly increased when a rare-earth containing substance is added to the vanadium-containing catalyst. More specially, the yield of sulfur can be further increased after adding an antimony-containing compound to the above-described mixed catalyst.

In order to understand the present invention in detail, some examples are illustrated as follows. Certainly, these examples should not be used to limit the scope of the present invention.

EXAMPLE 1

Vanadium-yttrium Catalyst

A) Preparation

The vanadium-yttrium catalyst used in this example is prepared by the following steps:

(1) 4.679 g $NH_4VO_3$ (commercially available from Showa Chemicals Inc. in Japan) is dissolved in 100 ml distilled water.

(2) 4.516 g $Y_2O_3$ (commercially available from Strem Chemicals Inc. in U.S.A.) is dissolved in 100 ml 1M nitric acid solution (commercially available from Riedel-deHaen Inc. in Germany)

(3) The solution of Step (1) and the solution of Step (2) are mixed together and 20.5 g citric acid (commercially available from Showa Chemicals Inc. in Japan) is added to this mixed solution.

(4) The obtained solution of Step (3) is heated to become a slurry and then dried overnight.

(5) The product of Step (4) is heated at 400° C. for 24 hours and then calcined at 550° C. for 6 hours.

B) Selective Oxidation of Hydrogen Sulfide 0.2 g mixed catalyst of the above Step (5) in the form of 20–40 mesh number particles is packed into a tubular glass reactor having an inner diameter of 8 mm, an outer diameter of 10 mm, and a length of 80 cm. The reaction temperature is controlled by an electrical heater installed around the reactor. The catalyst bed is presulfurized at 250° C. for at least 8 hours by introducing a 9 vol % hydrogen sulfide gas mixture into the reactor until a gaseous reaction product leaving the reactor had a stable hydrogen sulfide concentration. After the presulfurization step, a gaseous feed stream consisting of 1 vol % hydrogen sulfide, 5 vol % oxygen, and 94 vol % nitrogen is then introduced into the reactor at 200 ml/min. The reaction product exiting the reactor is introduced into a gas-solid separator which is connected to an outlet of the reactor and maintained at 25° C., in which the reaction product is separated into a solid product and a gaseous product. The composition of the gaseous product is analyzed by gas chromatography. The reaction conditions and results are listed in Table 1, in which the conversion (%) is defined as the mole of hydrogen sulfide reacted per mole of hydrogen sulfide in the feed stream, and the selectivity is defined as the mole of elemental sulfur formed per mole of the reacted hydrogen sulfide. As the selectivity is lower than 100%, it means that there is sulfur dioxide appeared in the gas exiting the gas-solid separator.

The catalytic performance of vanadium-yttrium catalyst is shown in Table 1.

TABLE 1

Catalytic performance of vanadium-yttrium catalyst

| Temperature (° C.) | Conversion (%) | Selectivity (%) | Yield of sulfur (%) |
|---|---|---|---|
| 180 | 38.2 | 100 | 38.2 |
| 200 | 74.7 | 100 | 74.7 |
| 210 | 91.8 | 100 | 91.8 |
| 220 | 95.9 | 95.3 | 91.4 |
| 230 | 97.9 | 86.3 | 84.5 |
| 240 | 98.8 | 62.0 | 61.3 |

COMPARATIVE EXAMPLE 1

Vanadium Catalyst

The preparation of the vanadium catalyst is the same as that described in Steps (1), and (3)–(5) of Example 1 without adding $Y_2O_3$ of Step (2) in Example 1. The reaction steps of selective oxidation of hydrogen sulfide are the same as those in Example 1, except that the vanadium-yttrium catalyst is replaced by vanadium catalyst. The reaction results are shown in Table 2.

TABLE 2

Catalytic performance of vanadium catalyst

| Temperature (° C.) | Conversion (%) | Selectivity (%) | Yield of sulfur (%) |
|---|---|---|---|
| 180 | 27.8 | 100 | 27.8 |
| 200 | 61.5 | 100 | 61.5 |
| 210 | 80.4 | 88.5 | 71.2 |
| 220 | 95.0 | 11.5 | 10.9 |

COMPARATIVE EXAMPLE 2

Yttrium Catalyst

The preparation of the yttrium catalyst is the same as that described in Steps (2)–(5) of Example 1 without adding $NH_4VO_3$ of Step (1) in Example 1. The reaction steps of selective oxidation of hydrogen sulfide are the same as those in Example 1, except that the vanadium-yttrium catalyst is replaced by yttrium catalyst. The reaction results are shown in Table 3.

TABLE 3

Catalytic performance of yttrium catalyst

| Temperature (° C.) | Conversion (%) | Selectivity (%) | Yield of sulfur (%) |
|---|---|---|---|
| 200 | 2.8 | 100 | 2.8 |
| 350 | 45.5 | 100 | 45.5 |
| 360 | 75.3 | 21.5 | 16.2 |

From Tables 1–3, it is found that the capability of vanadium-yttrium catalyst in the selective oxidation of hydrogen sulfide, including the catalyst activity, selectivity, and yield of sulfur, is superior to that of single vanadium catalyst or single yttrium catalyst.

EXAMPLE 2

Vanadium-cerium Catalyst

A) Preparation

The vanadium-cerium catalyst used in this example is prepared by the following steps:
(1) 3.5 g $NH_4VO_3$ (commercially available from Showa Chemicals Inc. in Japan) is dissolved in 100 ml distilled water.
(2) 13.03 g $Ce(NO_3)_4 \cdot 6H_2O$ (commercially available from Strem Chemicals Inc. in U.S.A.) is dissolved in 100 ml 1M nitric acid solution (commercially available from Riedel-deHaen Inc. in Germany)
(3) The solution of Step (1) and the solution of Step (2) are mixed together and 3.8 g citric acid (commercially available from Showa Chemicals Inc. in Japan) is added to this mixed solution.
(4) The obtained solution of Step (3) is heated to become a slurry and then dried overnight.
(5) The product of Step (4) is heated at 400° C. for 24 hours and then calcined at 550° C. for 6 hours.

B) Selective oxidation of hydrogen sulfide

The reaction steps are the same as those of Example 1 except that the vanadium-yttrium catalyst is replaced by vanadium-cerium catalyst. The results are shown in Table 4.

TABLE 4

Catalytic performance of vanadium-cerium catalyst

| Temperature (° C.) | Conversion (%) | Selectivity (%) | Yield of sulfur (%) |
|---|---|---|---|
| 180 | 30.5 | 100 | 30.5 |
| 200 | 43.4 | 100 | 43.4 |
| 210 | 70.1 | 100 | 70.1 |
| 220 | 83.5 | 100 | 83.5 |
| 230 | 93.1 | 100 | 93.1 |
| 240 | 97.5 | 81.9 | 79.9 |

COMPARATIVE EXAMPLE 3

Cerium Catalyst

The preparation of the cerium catalyst is the same as that described in Steps (2)~(5) of Example 2 without adding $NH_4VO_3$ of Step (1) in Example 2. The reaction steps of selective oxidation of hydrogen sulfide are the same as those in Example 1, except that the vanadium-yttrium catalyst is replaced by cerium catalyst. Consequently, the cerium catalyst becomes a viscous liquid during the presulfurization step and flows out of the reactor so that it can not catalyze the oxidation.

By comparing the results of Example 2 and those of Comparative examples 1 and 3, it is found that the capability of vanadium-cerium catalyst in the selective oxidation of hydrogen sulfide is superior to that of single vanadium catalyst or single cerium catalyst.

EXAMPLE 3

Vanadium-samarium Catalyst

A) Preparation

The vanadium-samarium catalyst is prepared by the following steps:
(1) 4.68 g $NH_4VO_3$ (commercially available from Showa Chemicals Inc. in Japan) is dissolved in 100 ml distilled water.
(2) 6.97 g $Sm_2O_3 \cdot 6H_2O$ (commercially available from Strem Chemicals Inc. in U.S.A.) is dissolved in 100 ml 1M nitric acid solution (commercially available from Riedel-deHaen Inc. in Germany)
(3) The solution of Step (1) and the solution of Step (2) are mixed together and 20.5 g citric acid (commercially available from Showa Chemicals Inc. in Japan) is added to this mixed solution.
(4) The obtained solution of Step (3) is heated to become a slurry and then dried overnight.
(5) The product of Step (4) is heated at 400° C. for 24 hours and then calcined at 550° C. for 6 hours.

B) Selective oxidation of hydrogen sulfide

The reaction steps are the same as those of Example 1, except that the vanadium-yttrium catalyst is replaced by vanadium-samarium catalyst. The reaction results are shown in Table 5.

TABLE 5

Catalytic performance of vanadium-samarium catalyst

| Temperature (° C.) | Conversion (%) | Selectivity (%) | Yield of sulfur (%) |
|---|---|---|---|
| 200 | 38.9 | 100 | 38.9 |
| 210 | 56.8 | 100 | 56.8 |
| 220 | 69.9 | 100 | 69.9 |
| 230 | 78.7 | 100 | 78.7 |
| 240 | 91.5 | 91.7 | 83.9 |
| 250 | 97.2 | 54.4 | 52.9 |

COMPARATIVE EXAMPLE 4

Samarium Catalyst

The preparation of the samarium catalyst is the same as that described in Steps (2)~(5) of Example 3 without adding $NH_4VO_3$ of Step (1) in Example 3. The reaction steps of selective oxidation of hydrogen sulfide are the same as those in Example 1, except that the vanadium-yttrium catalyst is replaced by samarium catalyst. The results are shown in Table 6.

TABLE 6

Catalytic performance of samarium catalyst

| Temperature (° C.) | Conversion (%) | Selectivity (%) | Yield of sulfur (%) |
|---|---|---|---|
| 200 | 13.5 | 100 | 13.5 |
| 300 | 44.7 | 100 | 44.7 |
| 320 | 56.5 | 96.8 | 54.7 |
| 330 | 60.5 | 83.1 | 50.3 |

By comparing the results of Example 3 and those of Comparative examples 1 and 4, it is found that the capability of vanadium-samarium catalyst in the selective oxidation of sulfur (the yield is up to 83.9%) is superior to that of single vanadium catalyst (the maximum yield of sulfur is 71.2%) or single samarium catalyst.

EXAMPLE 4

Vanadium-lanthanum Catalyst

A) Preparation

The vanadium-lanthanum catalyst used in this example is prepared by the following steps:
(1) 9.36 g $NH_4VO_3$ (commercially available from Showa Chemicals Inc. in Japan) is dissolved in 150 ml distilled water.

(2) 13.03 g $La_2O_3$ (commercially available from Strem Chemicals Inc. in U.S.A.) is dissolved in 150 ml 1M nitric solution (commercially available from Riedel-deHaen Inc. in Germany).

(3) The solution of Step (1) and the solution of Step (2) are mixed together and 41 g citric acid (commercially available from Showa Chemicals Inc. in Japan) is added to this mixed solution.

(4) The obtained solution of Step (3) is heated to become a slurry and then dried overnight.

(5) The product of Step (4) is heated at 400° C. for 24 hours and then calcined at 550° C. for 6 hours.

B) Selective oxidation of hydrogen sulfide

The reaction steps are the same as those of Example 1, except that the vanadium-yttrium catalyst is replaced by vanadium-lanthanum catalyst. The reaction results are shown in Table 7.

TABLE 7

Catalytic performance of vanadium-lanthanum catalyst

| Temperature (° C.) | Conversion (%) | Selectivity (%) | Yield of sulfur (%) |
|---|---|---|---|
| 180 | 27.0 | 100 | 27.0 |
| 200 | 55.5 | 100 | 55.5 |
| 210 | 70.3 | 100 | 70.3 |
| 220 | 83.6 | 94.3 | 78.8 |
| 230 | 88.9 | 85.1 | 75.7 |
| 240 | 92.7 | 45.3 | 42.0 |

COMPARATIVE EXAMPLE 5

Lanthanum Catalyst

The preparation of the lanthanum catalyst is the same as that described in Steps (2)–(5) of Example 4 without adding $NH_4VO_3$ of Step (1) in Example 4. The reaction steps of selective oxidation of hydrogen sulfide are the same as those in Example 1, except that the vanadium-yttrium catalyst is replaced by lanthanum catalyst. The results are shown in Table 8.

TABLE 8

Catalytic performance of lanthanum catalyst

| Temperature (° C.) | Conversion (%) | Selectivity (%) | Yield of sulfur (%) |
|---|---|---|---|
| 230 | 5.71 | 100 | 5.71 |
| 300 | 12.9 | 100 | 12.9 |
| 330 | 47.2 | 89.7 | 42.3 |

From Tables 2, 7, and 8, it is found that the capability of vanadium-lanthanum catalyst in the selective oxidation of hydrogen sulfide (the yield is up to 78.8%) is superior to that of single vanadium catalyst (the highest yield of sulfur is 71.2%) or single lanthanum catalyst.

Examples 5–7 will demonstrate that the sulfur yield of selective oxidation of hydrogen sulfide can be greatly increased after adding a promoter (e.g. metallic antimony, antimony oxide, antimony sulfide, antimony halogenide, antimony carbide, antimony hydroxide, antimony hydride, antimony oxychloride, antimony sulfate, and antimonate, etc.) to the mixed catalyst including vanadium and rare-earth element.

EXAMPLE 5

The Mixed Catalyst Containing Vanadium, Lanthanum, and Antimony

Preparation of this Mixed Catalyst

This mixed catalyst is prepared by mechanically mixing the vanadium-lanthanum catalyst and $\alpha\text{-}Sb_2O_4$. The preparation procedure includes the steps as follows:

Step A: The vanadium-lanthanum catalyst is obtained by the steps of Example 4.

Step B: Preparation of $\alpha\text{-}Sb_2O_4$ catalyst $Sb_2O_3$ (commercially available from ACROS Company in New Jersey, U.S.A.) is calcined at 500° C. for 20 hours to obtain $\alpha\text{-}Sb_2O_4$.

Step C: Mechanically mixing the vanadium-lanthanum catalyst and $\alpha\text{-}Sb_2O_4$.

1.2 the vanadium-lanthanum catalyst prepared from Step A and 1 g $\alpha\text{-}Sb_2O_4$ obtained from Step B are added to 40 ml pentane (commercially available from TEDIA Company in Ohio, U.S.A.) and them stirred at room temperature. Thereafter, the mixture is evaporated under vacuum and then dried at 80° C. for 12 hours to obtain the mixed catalyst comprising vanadium, lanthanum, and antimony. Because the mixed catalyst has never been calcined, the vanadium-lanthanum catalyst and $\alpha\text{-}Sb_2O_4$ are physically mixed together in the mixed catalyst.

Selective Oxidation of Hydrogen Sulfide

The reaction steps are the same as those of Example 1, except that the vanadium-yttrium catalyst is replaced by the mixed catalyst comprising vanadium, lanthanum, and antimony. The results are shown in Table 9.

TABLE 9

Catalytic performance of the mixed catalyst comprising vanadium, lanthanum, and antimony

| Temperature (° C.) | Conversion (%) | Selectivity (%) | Yield of sulfur (%) |
|---|---|---|---|
| 180 | 19.6 | 100 | 19.6 |
| 200 | 32.6 | 100 | 32.6 |
| 210 | 53.4 | 100 | 53.4 |
| 220 | 72.5 | 100 | 72.5 |
| 230 | 86.3 | 100 | 86.3 |
| 240 | 92.8 | 100 | 92.8 |
| 250 | 97.5 | 100 | 97.5 |
| 260 | 98.6 | 100 | 98.6 |
| 270 | 99.3 | 86.7 | 86.1 |

COMPARATIVE EXAMPLE 6

$\alpha\text{-}Sb_2O_4$ Catalyst

The preparation of the $\alpha\text{-}Sb_2O_4$ catalyst is the same as that described in Step B of Example 5. The reaction steps of selective oxidation of hydrogen sulfide are the same as those in Example 1, except that the vanadium-yttrium catalyst is replaced by $\alpha\text{-}Sb_2O_4$ catalyst. The reaction results are shown in Table 10.

TABLE 10

Catalytic performance of α-Sb₂O₄ catalyst

| Temperature (° C.) | Conversion (%) | Selectivity (%) | Yield of sulfur (%) |
|---|---|---|---|
| 220 | 4.3 | 100 | 4.3 |
| 280 | 16.7 | 100 | 16.7 |
| 300 | 33.5 | 100 | 33.5 |

From the data shown in Tables 7, 9, and 10, the catalytic performance of the mixed catalyst including vanadium, lanthanum, and antimony (the yield is up to 98.6%) is significantly superior to single α-Sb₂O₄ catalyst or the vanadium-lanthanum catalyst (the highest yield is only 78.8%).

EXAMPLE 6

The Mixed Catalyst Containing Vanadium, Yttrium, and Antimony

Preparation of the Catalyst

This mixed catalyst is prepared by the same steps as Example 5, except that the vanadium-lanthanum catalyst used in Steps A and C is replaced by the vanadium-yttrium catalyst prepared from Example 1.

Selective Oxidation of Hydrogen Sulfide

The reaction steps are the same as those of Example 1, except that the vanadium-yttrium catalyst is replaced by the mixed catalyst including vanadium, yttrium, and antimony. The results are shown in Table 11.

TABLE 11

Catalytic performance of the mixed catalyst comprising vanadium, yttrium, and antimony

| Temperature (° C.) | Conversion (%) | Selectivity (%) | Yield of sulfur (%) |
|---|---|---|---|
| 180 | 27.5 | 100 | 27.5 |
| 200 | 78.7 | 100 | 78.7 |
| 210 | 92.5 | 100 | 92.5 |
| 220 | 96.4 | 100 | 96.4 |
| 230 | 99.2 | 99.4 | 98.6 |
| 240 | 99.6 | 97.3 | 96.9 |
| 250 | 99.7 | 89.4 | 89.1 |

From the data shown in Tables 1, 10, and 11, the catalytic performance of the mixed catalyst comprising vanadium, yttrium, and antimony (the yield is up to 98.6%) is greatly superior to single α-Sb₂O₄ catalyst or the vanadium-yttrium catalyst (the highest yield is only 91.8%).

EXAMPLE 7

The Mixed Catalyst Containing Vanadium, Cerium, and Antimony

Preparation of the Catalyst

This mixed catalyst is equally prepared by the steps of Example 5, except that the vanadium-lanthanum catalyst used in Steps A and C is replaced by the vanadium-cerium catalyst prepared from Example 2.

Selective Oxidation of Hydrogen Sulfide

The reaction steps are the same as those of Example 1, except that the vanadium-yttrium catalyst is replaced by the mixed catalyst including vanadium, cerium, and antimony. The results are shown in Table 12.

TABLE 12

Catalytic performance of the mixed catalyst including vanadium, cerium, and antimony

| Temperature (° C.) | Conversion (%) | Selectivity (%) | Yield of sulfur (%) |
|---|---|---|---|
| 200 | 45.1 | 100 | 45.1 |
| 230 | 90.5 | 100 | 90.5 |
| 240 | 97.2 | 100 | 97.2 |
| 250 | 99.5 | 96.5 | 96.0 |
| 260 | 99.9 | 84.8 | 84.7 |

From all data shown in Tables 4, 10, and 12, the catalytic performance of the mixed catalyst comprising vanadium, cerium, and antimony (the yield is up to 97.2%) is significantly superior to single α-Sb₂O₄ catalyst or the vanadium-cerium catalyst (the highest yield is only 93.1%).

In conclusion, the present invention provides a novel method for recovering elemental sulfur from a gas mixture containing hydrogen sulfide by selective oxidation of hydrogen sulfide in the presence of the mixed catalyst containing a rare-earth-containing substance and a vanadium-containing material. The catalytic performance of this mixed catalyst is superior to that of a single rare-earth-containing substance or a vanadium-containing material (please refer to Examples 1–4 and Comparative examples 1–5). Such a multi-component catalyst can significantly increase the yield of elemental sulfur. Not only does the mixed catalyst greatly increase the recovering yield of elemental sulfur, but it meets the requirement of environmental protection.

In addition, if a promoter (e.g. metallic antimony, antimony oxide, antimony sulfide, antimony halogenide, antimony carbide, antimony hydroxide, antimony hydride, antimony oxychloride, antimony sulfate, and antimonate, etc.) is added to the mixed catalyst as described above, it can exhibit a more effective catalytic performance in comparison with the mixed catalyst containing vanadium and rare-earth element only (see Examples 5–7).

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method for oxidizing hydrogen sulfide to elemental sulfur comprising a step of oxidizing hydrogen sulfide to elemental sulfur in the presence of a catalyst including a vanadium-containing material and a catalytic substance selected from the group consisting of scandium (Sc), yttrium (Y), lanthanum (La), samarium (Sm), and compounds thereof.

2. The method according to claim 1 wherein said vanadium-containing material is one selected from a group consisting of metallic vanadium, vanadium oxide, vanadium sulfide, vanadium halogenide, vanadium nitride, vanadium phosphide, vanadium carbide, vanadium carbonyl, vanadium hydride, vanadium hydroxide, vanadium sulfate, vanadium nitrate, vanadium carbonate, vanadium acetate, vanadium oxalate, vanadium formate, vanadium phosphate, vanadium citrate, vanadium oleate, ammonium vanadium oxalate, ammonium vanadium citrate, vanadium hypohalogenate, vanadyl carbonate, vanadyl salicylate, vanadium chromate, ammonium vanadate, and vanadate.

3. The method according to claim 1, wherein said catalyst is deposited on a carrier selected from the group consisting of monolith, particle and porous carriers.

4. The method according to claim 3, wherein the porous carrier is one selected from the group consisting of alumina, silica, aluminum-and-silicon-containing compounds, titanium oxide, and zirconium oxide.

5. The method according to claim 1 wherein the molar ratio of the catalytic element of the catalytic substance to vanadium atom of the vanadium-containing material ranges from 0.01:1 to 100:1.

6. The method according to claim 1, wherein the molar ratio of the catalytic element of the catalytic substance to vanadium atom of the vanadium-containing material ranges from 0.1:1 to 10.1.

7. The method according to claim 1 wherein the catalyst further includes an antimony-containing promoter for increasing the yield of elemental sulfur.

8. The method according to claim 7 wherein the molar ratio of the promoter to vanadium and catalytic element of the catalyst ranges from 0.01:1 to 100:1.

9. The method according to claim 7 wherein the molar ratio of the promoter to vanadium and catalytic element of the catalyst ranges from 0.1:1 to 100:1.

10. The method according to claim 7 wherein said promoter is one selected from a group consisting of metallic antimony, antimony oxide, antimony sulfide, antimony halogenide, antimony carbide, antimony hydroxide, antimony hydride, antimony oxychloride, antimony sulfate, and antimonate.

11. The method according to claim 1 wherein the method is performed at a temperature range of between 50° C. and 400° C.

12. The method according to claim 1 wherein the method is performed at a temperature range of between 100° C. and 350° C.

13. The method according to claim 1 wherein the method is performed at a pressure range of from 0.1 to 50 atm.

14. The method according to claim 1 wherein the method is performed at a pressure range of from 1 to 10 atm.

* * * * *